United States Patent
Shinotsuka et al.

(10) Patent No.: US 7,613,091 B2
(45) Date of Patent: Nov. 3, 2009

(54) METHOD FOR IDENTIFYING DOUBLE-LAYER DISC AND OPTICAL DISC APPARATUS

(75) Inventors: Michiaki Shinotsuka, Hiratsuka (JP); Hiroyuki Iwasa, Yokohama (JP); Masaru Shinkai, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 659 days.

(21) Appl. No.: 11/336,911

(22) Filed: Jan. 23, 2006

(65) Prior Publication Data

US 2006/0164943 A1 Jul. 27, 2006

Related U.S. Application Data

(63) Continuation of application No. PCT/JP2004/010332, filed on Jul. 21, 2004.

(30) Foreign Application Priority Data

| Jul. 23, 2003 | (JP) | ............................. 2003-200209 |
| Mar. 9, 2004 | (JP) | ............................. 2004-066108 |

(51) Int. Cl.
*G11B 7/00* (2006.01)
(52) U.S. Cl. .................................................. 369/53.22
(58) Field of Classification Search .............. 369/44.25, 369/44.26, 112.01, 44.37, 53.22, 94
See application file for complete search history.

(56) References Cited

U.S. PATENT DOCUMENTS 5,748,598 A * 5/1998 Swanson et al. .............. 369/94

5,831,952 A 11/1998 Yamada et al.
6,628,593 B1 * 9/2003 Yamashita et al. ........ 369/53.22
7,075,873 B2 * 7/2006 Ito .............................. 369/53.2

FOREIGN PATENT DOCUMENTS

| EP | 0 789 354 A2 | 8/1997 |
| JP | 11-066622 A | 3/1999 |
| JP | 11-306650 A | 11/1999 |
| JP | 2001-052342 A | 2/2001 |
| JP | 2002-074679 A | 3/2002 |
| JP | 2002-312933 A | 10/2002 |

OTHER PUBLICATIONS

K. Nishiuchi et al., "Dual-Layer Optical Disk with Te-O-Pd Phase-Change Film," Jpn. J. Appl. Phys., vol. 37, Part 1, No. 4B, Apr. 1998, Tokyo, Japan, pp. 2163-2167.
K. Nagata et al., "Rewritable Dual-Layer Phase-Change Optical Disk," Jpn. J. Appl. Phys., vol. 38, Part 1, No. 3B, Mar. 1999, Tokyo, Japan, pp. 1679-1686.

* cited by examiner

*Primary Examiner*—Nabil Z Hindi
(74) *Attorney, Agent, or Firm*—Dickstein Shapiro LLP

(57) ABSTRACT

The object of the present invention is to enable the identification of double-layer disc type (recordable double-layer disc, rewritable double-layer disc and ROM-type double-layer disc) to be easily and accurately performed. The method for identifying double-layer disc contains obtaining a reflectance of each light by irradiating light of different wavelengths under focused state to each layer of a double-layer disc loaded in an optical apparatus, and identifying if the double-layer disc is a recordable double-layer disc, a rewritable double-layer disc or a ROM-type double-layer disc corresponding to the combination of reflectance of each obtained light. It is preferable that the wavelength of one light is a wavelength for DVD-based disc and the wavelength of the other light is a wavelength for CD-based disc.

8 Claims, 3 Drawing Sheets

METHOD FOR IDENTIFYING DOUBLE-LAYER DISC AND OPTICAL DISC APPARATUS

CROSS-REFERENCE TO RELATED APPLICATIONS

This is a continuation of Application No. PCT/JP2004/010332, filed on Jul. 21, 2004.

BACKGROUND OF THE INVENTION

1. Field of the Invention

The present invention relates to a method for identifying double-layer disc and an optical disc apparatus.

2. Description of the Related Art

In recent years, there are many varieties of optical discs including DVD-based discs of high-density recording such as DVD-ROM, DVD±R, DVD±RW, etc. which have been increasingly developed and made commercially available as well as conventional CD-based discs such as CD-ROM, CD-R, CD-RW, etc. Furthermore, multilayer discs for improving memory capacity of one disc, double-layer discs in general, have been proposed in various occasions. In particular, a double-layer DVD-ROM has already been made commercially available.

Under the circumstances, an optical disc apparatus into which various discs are loaded is required to be compatible which can correspond to these various discs by itself. For example, an optical disc apparatus capable of handling DVD-based optical discs is required to be able to record and reproduce CD-based discs as well as DVD-based discs.

It is constitutionally necessary for a compatible-type optical disc apparatus to identify the type of optical discs loaded into the optical disc apparatus prior to recording and reproducing because recording and reproducing method or the conditions (parameters) of information differ many times depending on the type of optical discs.

The conventional art relating to this kind of disc identification include an identification technique which discriminates a DVD-based disc between recordable disc, rewritable disc and ROM disc based on the reflectance since reflectance of single-layer ROM disc and single-layer recordable disc are 45% or more and the reflectance of double-layer ROM disc and single-layer rewritable disc are 18% or more and 30% or less, for example.

Conventionally, disc type identification has been performed by drawing focus at a CD wavelength and looking at RF signal level. When the reflectance is high (45% to 60%), a disc is identified as a CD-ROM or a CD-R and when the reflectance is low (15% to 30%), it is identified as a CD-RW and it is further reconfirmed as CD-based or not by looking at S-curve with more tracking. However, it takes time to identify a CD-R or a CD-ROM, because it is necessary to perform further recording or to verify presence or absence of wobble. If it is identified as non CD, DVD identification will take place. DVD-ROM includes a single-layer medium having only a first layer and a double-layer medium having two layers of first and second layers. It is possible to discriminate from the reflectance alone when DVD-ROM is a single-layer medium because only first layer of the single-layer medium has a high reflectance (45% to 60%). However, the reflectance of the first and second layers of double-layer DVD-ROM are the same as double-layer DVD±R or DVD±RW medium and it is impossible to discriminate from the reflectance alone. Therefore as similar to CD, it is identified as a DVD-R or DVD-RW by performing a recording, etc. after it has been identified as DVD from presence or absence of wobble or by looking at S curve with further tracking and the process takes a long time.

Furthermore, a method for identifying disc types comprehensively based on the signal information after obtaining all the signals of reflection, focus error and tracking error based on the reflective light of each laser beam irradiated once from the laser beam sources for CD and DVD mounted on an assumed compatible optical disc apparatus is proposed in Japanese Patent Application Laid-Open (JP-A) No. 11-306650.

Moreover, a method for identifying which contain a step of operating a focus servo, a step of obtaining tracking error signal of push-pull type from optical discs, and a step of identifying optical disc types such as DVD-RAM, DVD-RW or DVD+RW, for example, by comparing amplitude of tracking error signal with a predetermined value is proposed in JP-A No. 2002-312933. Or a method of using frequency of wobble signal is also proposed in JP-A No. 2002-312933.

However, in the method disclosed in JP-A No. 11-306650, identification of double-layer disc is not assumed, there is no way to discriminate between double-layer DVD discs such as DVD-ROM, DVD±R and DVD±RW and the identification process is complicated because it is comprehensively decided based on the reflection signal, focus error signal and tracking error signal, etc.

On the other hand, in the method disclosed in JP-A No. 2002-312933, discriminating between DVD-RAM and DVD±RW is performed based on the frequency of push-pull signal or wobble signal and it is effective for discriminating between single-layer DVD disc and double-layer DVD ROM. However, it is impossible to discriminate between double-layer DVD discs such as DVD-ROM, DVD±R and DVD±RW.

SUMMARY OF THE INVENTION

The object of the present invention is to enable the identification of double-layer disc type (recordable double-layer disc, rewritable double-layer disc and ROM-type double-layer disc) to be easily and accurately performed.

The above issue is settled by the next inventions 1 to 12 (hereinafter may be referred to as "the present inventions 1 to 12").

1) A method for identifying double-layer disc which contains obtaining a reflectance of each light by irradiating light of different wavelengths under focused state to each layer of a double-layer disc loaded in an optical apparatus, and identifying if the double-layer disc is a recordable double-layer disc, a rewritable double-layer disc or a ROM-type double-layer disc corresponding to the combination of reflectance of each obtained light.

2) The method for identifying double-layer disc as defined in 1), wherein the wavelength of one light is a wavelength for DVD-based disc and the wavelength of the other light is a wavelength for CD-based disc.

3) The method for identifying double-layer disc as defined in 1), wherein when the combination of reflectance of each obtained light is 15% or more for both lights, it is identified as a ROM-type double-layer disc, when the reflectance of one light is 15% or more and the reflectance of the other light is 4% or more and less than 15%, it is identified as a recordable double-layer disc, and when the reflectance of both lights is 4% or more and less than 15%, it is identified as a rewritable double-layer disc.

4) The method for identifying double-layer disc as defined in 3), wherein when the combination of reflectance of each obtained light is less than 4% for both lights, it is identified as a nonstandard disc.

5) The method for identifying double-layer disc as defined in 1), wherein the method for identifying double-layer disc contains identifying if it is a single-layer disc or a double-layer disc.

6) The method for identifying double-layer disc as defined in 1), wherein the method for identifying double-layer disc contains identifying if it is a CD-based disc or a DVD-based disc.

7) The method for identifying double-layer disc as defined in 4), wherein when the reflectance of the light of DVD wavelength is 15% or more and the reflectance of the light of CD wavelength is 4% or more and less than 15%, it is identified as a recordable double-layer disc.

8) An optical disc apparatus containing an optical pickup which contains two light sources of different wavelengths and selectively irradiates each light to a loaded disc, a number identification unit for recording layer which identifies if the loaded disc is a double-layer disc in a disc type identification mode, a reflectance calculating unit in which a reflectance of each light is obtained by irradiating light of different wavelengths under focused state to each layer of a double-layer disc using the optical pickup when the loaded disc is a double-layer disc, and a double-layer disc identification unit which identifies if the double-layer disc is a recordable double-layer disc, a rewritable double-layer disc or a ROM-type double-layer disc corresponding to the combination of reflectance of each obtained light.

9) The optical disc apparatus as defined in 8), wherein the wavelength of the light irradiated from one light source is a wavelength for DVD-based disc and the wavelength of the light irradiated from the other light source is a wavelength for CD-based disc.

10) The optical disc apparatus as defined in 8), wherein the double-layer identification unit identifies it as a ROM-type double-layer disc when the combination of reflectance of each obtained light is 15% or more for both lights, as a recordable double-layer disc when the reflectance of one light is 15% or more and the reflectance of the other light is 4% or more and less than 15%, and as a rewritable double-layer disc when the reflectance of both lights is 4% or more and less than 15%.

11) The optical disc apparatus as defined in 10), wherein the double-layer disc identification unit identifies it as a nonstandard disc when the combination of reflectance of each obtained light is less than 4% for both lights.

12) The optical disc apparatus as defined in 9), wherein when the reflectance of the light of DVD wavelength is 15% or more and the reflectance of the light of CD wavelength is 4% or more and less than 15%, it is identified as a recordable double-layer disc.

A type of double-layer disc can be easily and correctly identified using the difference in combination of reflectance when the light of different wavelengths is irradiated according to the present invention 1.

Furthermore, a type of double-layer disc can be easily identified by using two light sources mounted on an optical disc apparatus compatible for DVD-based and CD-based according to the present invention 2.

Moreover, the range of difference in combination of reflectance of double-layer discs becomes clear in order to implement the present inventions 1 and 2 according to the present invention 3.

A nonstandard disc can be properly identified according to the present invention 4.

A double-layer disc can be properly identified according to the present invention 5.

A double-layer DVD-based disc can be properly selected according to the present invention 6.

The same influence and effect of the present inventions 1 to 4 can be obtained by the optical disc apparatus according to the present inventions 8 to 12.

DESCRIPTION OF THE PREFERRED EMBODIMENTS

Figure 1:
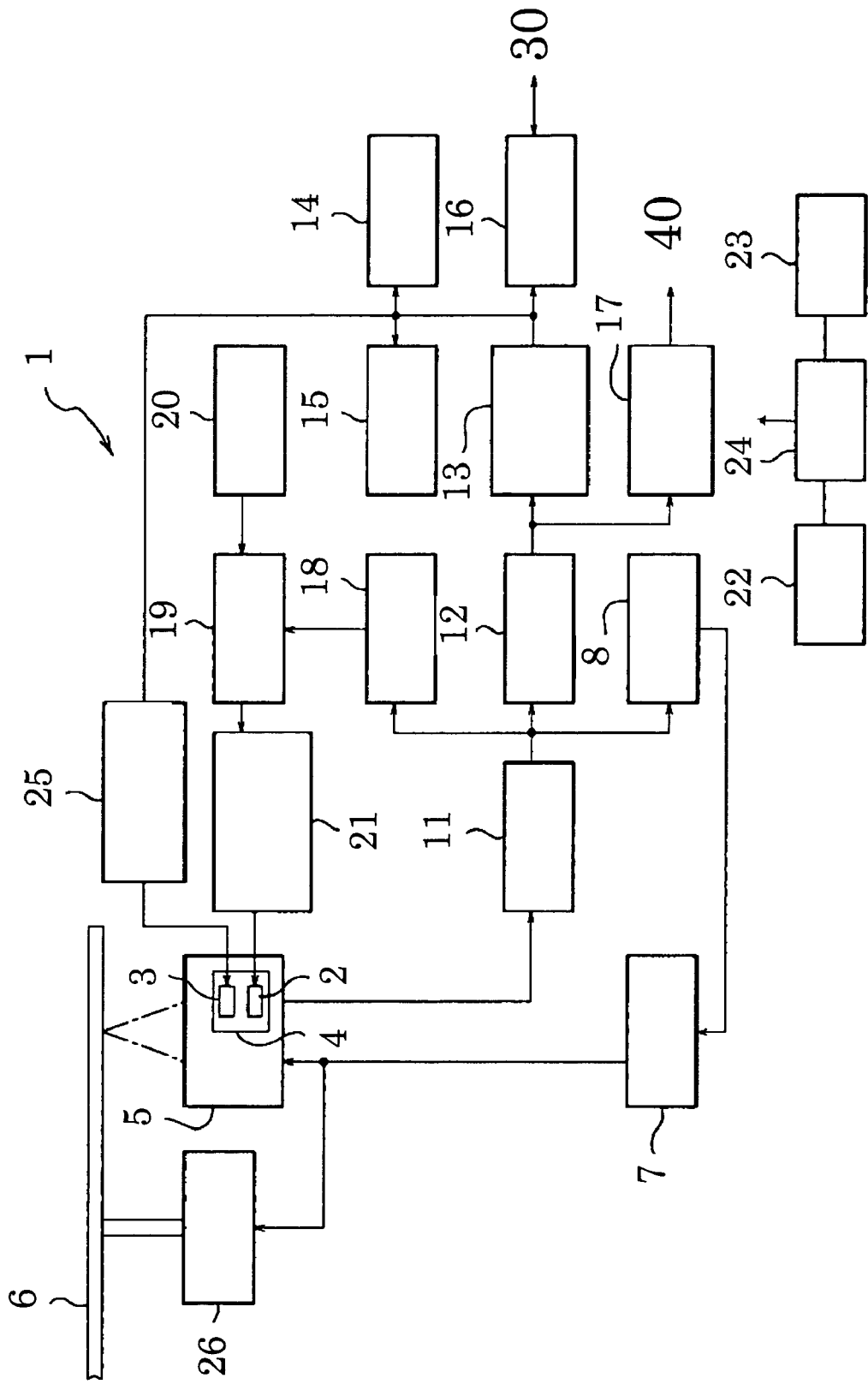
FIG. 1 is a block diagram primarily showing a signal processing system of an optical disc apparatus according to an embodiment of the present invention.

An embodiment of the present invention will be explained referring to the drawings.

The optical disc apparatus according to the embodiment of the present invention is an application example of the optical disc apparatus 1 compatible for CD/DVD-based. FIG. 1 is a block diagram primarily showing a signal processing system of the optical disc apparatus.

The embodiment of the present invention has an optical pickup apparatus 5 containing a light source unit 4 with a built-in chip of a laser diode (light source) 2 which irradiates a laser beam of CD wavelength of 780 nm and a laser diode (light source) 3 which irradiates a laser beam of DVD wavelength of 660 nm. It is an application example of an optical disc apparatus compatible for CD-based/single-layer DVD-based/double-layer DVD-based optical disc 6. In particular, it is an example of the optical disc apparatus compatible for CD-ROM, CD-R, CD-RW, DVD-ROM, DVD±R, DVD±RW, double-layer DVD ROM (double-layer ROM-type disc), double-layer DVD±R (recordable double-layer disc) and double-layer DVD±RW (rewritable double-layer disc) as an optical disc 6.

The optical disc 6 is rotary driven by a spindle motor 26 making up the main part of the rotary drive mechanism in the optical disc apparatus 1 as shown in FIG. 1. The spindle motor 26 is controlled so as to have a constant linear velocity, for example, by a motor driver 7 and a servo unit 8. This linear velocity can be altered in stages. The pickup apparatus 5 has a built-in light-receiving element and a position sensor as well as the laser diode 2 and 3, an optical system which corresponds to objective lenses (not shown), tracking/focusing actuator (not shown), and the like and irradiates laser beams to the optical disc 6 from laser diode 2 and 3 being alternatively driven. Moreover, the optical pickup apparatus 5 is movable in a sledge direction by a seek motor (not shown). These tracking/focusing actuator and seek motor are controlled so that the spot of a laser beam is positioned at an objected place of the optical disc 6 by the motor driver 7 and the servo unit 8 based on the obtained signal from the light-receiving element and the position sensor.

During reading, a reproduction signal obtained by the optical pickup apparatus 5 is entered into the CD/DVD decoder 12 after it has become a binary signal by being amplified in the reproduction signal processing circuit 11. The entered binary data is EFM (Eight to Fourteen Modulation) demodulated in the CD/DVD decoder 12. Meanwhile, a recorded data is EFM modulated 8 bits at a time and 8 bits are converted to 14 bits by this EFM modulation and the total becomes 17 bits with 3 bits of binding bits added. In this case, binding bits are added so as to have equal numbers of "1" and "0" on the average. This is called "DC component suppression" and slice level fluctuation of DC-suppressed reproduction signal is inhibited.

Demodulated data is deinterleaved and processed for error correction. And then the data is entered into the CD/DVD-ROM decoder 13 and processed for further error correction to improve reliability of data. The data which has been processed for error correction twice is stored once in buffer RAM 15 by the buffer manager 14 and transferred to the host computer 30 at once through ATAPI/SCSI interface 16 as a gathered sector data. In the case of music data, output data from the CD/DVD decoder 12 is entered into the D/A converter 17 and read out as an analog audio output signal, audio 40.

During writing, the data sent from a host computer through ATAPI/SCSI interface 16 is accumulated once in the buffer RAM 15 by the buffer manager 14. When the data in the buffer RAM 15 is accumulated to an extent, writing will start, however, it is necessary to position the laser spot to the starting point of writing before it start. The starting point can be obtained by a wobble signal which is written in advance on the optical disc 6 by wobbling track.

Absolute time information which is called "ATIP" is included in the wobble signal and the information is read out by the ATIP decoder 18. The synchronized signal generated by the ATIP decoder 18 is entered into the CD encoder 19 enabling to write a data into a correct position on the optical disc 6. The data in the buffer RAM 15 is added with error correction code or interleaved in the CD-ROM encoder 20 or CD encoder 19 and recorded to the optical disc 6 through the laser controller 21 for CD-R/RW and laser diode 2 in the optical pickup apparatus 5.

This kind of optical disc apparatus is controlled entirely by CPU 24 composed as a microcomputer with ROM 22 and RAM 23. When a DVD-based optical disc 6 is loaded, recording and reproducing of the optical disc 6 are performed by irradiating the laser diode 3 in the optical pickup apparatus 5 by the laser controller 25 for DVD. Therefore, the laser controller 21, 25 and CPU 24 function as a light source driving unit which selectively drive the laser diode 2 and 3 in the light source unit 4 alternatively corresponding to the type of the optical disc 6.

With these basic configurations, a disc type identification mode for identifying a disc type is operated when an optical disc 6 is loaded in the optical disc apparatus 1 in this embodiment. In particular, it has a special feature in identifying a disc type when a double-layer disc such as DVD-ROM, DVD±R and DVD±RW was loaded as an optical disc 6.

In this embodiment, the laser diode 2 for CD which is not practically used is used with the laser diode 3 which is primarily used for recording and reproducing during recording and reproducing operations of the double-layer disc and the reflectance of each light is obtained. And by recognizing the differences in the combination of reflectance of each light depending on the type of a double-layer disc, the type of a double-layer disc is identified corresponding to the combination.

A DVD+R (pigment sample), DVD+RW (phase-change sample) and DVD-ROM (medium with pits) were prepared for this kind of double-layer disc and the reflectance when the light of 660 nm for DVD was irradiated and the reflectance when the light of 780 nm for CD was irradiated were measured and obtained result is shown in Table 1 as a data example (standard).

TABLE 1

|  |  | DVD Wavelength 660 nm | CD Wavelength 780 nm |
|---|---|---|---|
| DVD + R | Pigment Sample | 18 | 6 |
| DVD + RW | Phase-Change Sample | 8 | 5 |
| DVD-ROM | Medium with Pits | 23 | 23 |

A DVD+R (pigment sample), DVD+RW (phase-change sample) and DVD-ROM (medium with pits) were prepared as single-layer discs and the reflectance when the light of 660 nm for DVD was irradiated and the reflectance when the light of 780 nm for CD was irradiated were measured and the obtained result is shown in Table 2 as a data example (standard).

TABLE 2

|  |  | DVD Wavelength 660 nm | CD Wavelength 780 nm |
|---|---|---|---|
| DVD + R | Pigment Sample | 48 | 8 |
| DVD + RW | Phase-Change Sample | 20 | 12 |
| DVD-ROM | Medium with Pits | 55 | 55 |

From the data example (standard) as shown in Table 1, it turns out that the types of double-layer discs can be identified corresponding to the combination of reflectance of each light of 660 nm and 780 nm as follow:

When the reflectance of both lights is 15% or more: DVD-ROM

When the reflectance of light of DVD wavelength is 15% or more and the reflectance of light of CD wavelength is 4% or more and less than 15%: DVD+R When the reflectance of both lights is 4% or more and less than 15%: DVD+RW Furthermore, when the reflectance of both lights is less than 4%, it is identified as a nonstandard disc.

As for the DVD-R and DVD-RW of double-layer discs, the reflectance of DVD-R is equivalent to that of DVD+R and the reflectance of DVD-RW is equivalent to that of DVD+RW and it is possible to discriminate them from DVD-ROM, etc. same as DVD+R and DVD+RW. Moreover, since each pit of DVD-R and DVD-RW is formed near 23.9 mm to 24.0 mm of disc radius, DVD-R and DVD-RW can be discriminated from DVD+R and DVD+RW if the reflectance of each medium is non-recorded in 60% to 70% of above disc radius when observed by a low-pass filter of approximately 30 KHz.

As for the single-layer DVD disc, it can be identified as a DVD-ROM or DVD-R with the reflectance of 45% or more, a DVD-RW with the reflectance of 30% or less and 18% or more as it has already been operated in the commercially available drives. For such single-layer DVD discs, it is also possible to identify a disc type by using the reflectance characteristics corresponding to the wavelength as shown in Table 2.

When the reflectance of both lights is 45% or more: DVD-ROM

Figure 2:
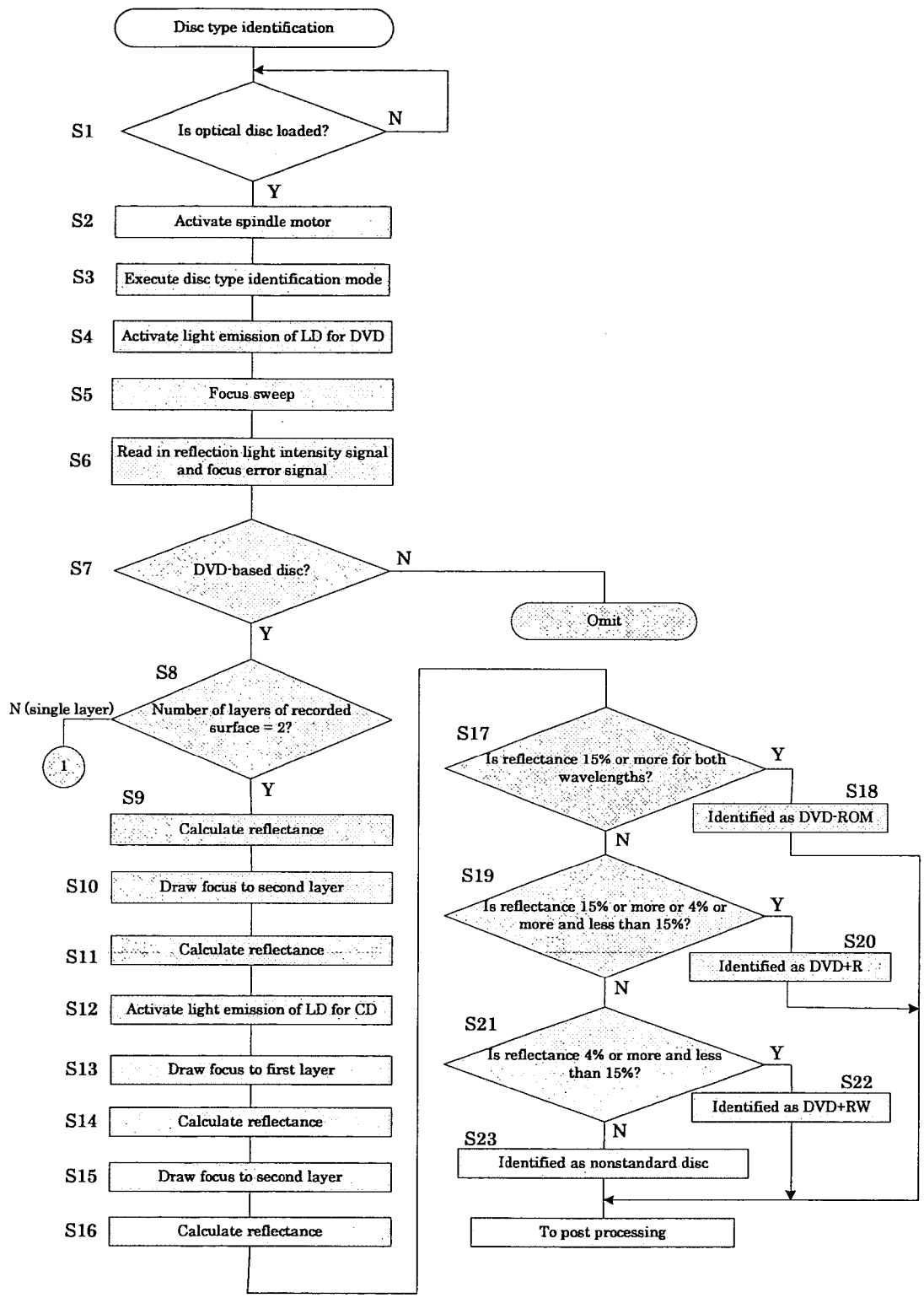
FIG. 2 is an outlined flow chart showing an exemplary disc type identification process.
Figure 3:
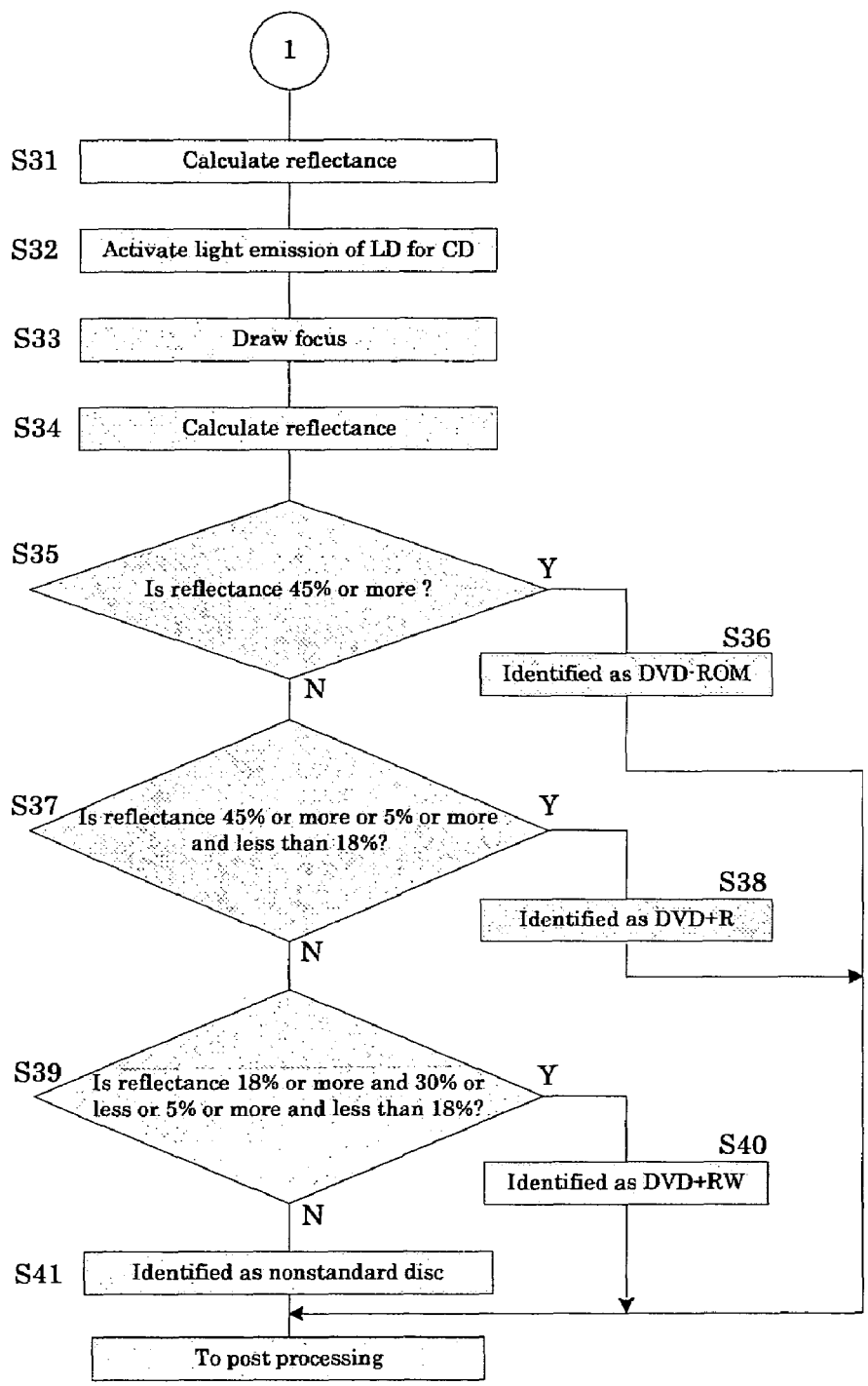
FIG. 3 is an outlined flow chart showing rest of an exemplary disc type identification process.

When the reflectance of light of DVD wavelength is 45% or more and the reflectance of light of CD wavelength is 5% or more and less than 18%: DVD+R When the reflectance of light of DVD wavelength is 18% or more and 30% or less and the reflectance of light of CD wavelength is 5% or more and less than 18%: DVD+RW When the reflectance of both lights is less than 5%: non-standard disc Using the reflectance characteristics corresponding to these wavelengths, the optical disc apparatus 1 of the embodiment can perform disc type identification process, particularly the double-layer disc type identification process, according to the outlined flow chart as shown in FIGS. 2 and 3 under CPU 24 control.

In the embodiment, following identification process is programmed as operable as a disc type identification process mode when an optical disc 6 is loaded.

It is always being watched if an optical disc is loaded or not (step S1). When a loaded disc is detected (Y of S1), spindle motor 26 is activated, the optical disc 6 is rotated (S2) and a transition is made to operate the disc type identification mode (S3).

One of the light sources, laser diode 3 for DVD is emission-activated (S4) and a focus sweep is performed in which a focal position of the laser beam is moved in the focusing direction at a constant velocity through servo unit 8, motor driver 7 and focus actuator, etc (S5). Obtained reflection light intensity signal and focus error signal during focus sweeping are read in through reproduction signal processing circuit 11 (S6) and the distance from the surface to the recorded surface of the optical disc 6 is calculated based on these signals and the optical disc 6 is identified as CD-based disc or DVD-based disc by the distance (S7). As it has already been known, it is approximately 1.2 mm for CD-based disc and approximately 0.6 mm for DVD-based disc.

When it is identified as a CD-based disc with more than predetermined distance (thickness) (N of S7) by above identification, the disc type identification process for CD disc can be performed by known method such as the one disclosed in JP-A No. 2002-312933, etc., for example, later on.

When it is identified as a DVD-based disc with less than predetermined distance (thickness) (Y of S7), the number of layers in the recorded surface of the optical disc 6 is identified based on the reflection light intensity signal and focus error signal (S8). And the process of step S8 is operated as a function of number of recording layer identification unit. Since the technique is known by JP-A No. 2002-312933, etc., for example, the details are omitted.

When it is identified as a double-layer disc (Y of S8) by number of layer identification, the reflective light of irradiated light from the laser diode 3 to the first recording layer (the first layer) under focused state is received by a light-receiving element and the reflectance is calculated from the RF signal level obtained by processing in the reproduction signal processing circuit 11 (S9). Furthermore, the focus is drawn to the second recording layer (the second layer) (S10), the reflective light of irradiated light from the laser diode 3 to the second recording layer (the second layer) under focused state is received by a light-receiving element and the reflectance is calculated from the RF signal level obtained by processing in the reproduction signal processing circuit 11. In particular, the reflectance can be determined by comparing with the RF signal level corresponding to the absolute reflectance which is checked with a reproduction light power and set in advance (S11). Obtained reflectance is once stored in RAM 23, etc.

Continuously, the laser diode 2 for CD of 780 nm wavelength is emitted instead of laser diode 3 (S12), the focus is drawn to the first recording layer (the first layer) (S13), the reflective light of irradiated light from the laser diode 2 to the first recording layer (the first layer) under focused state is received by a light-receiving element and the reflectance is calculated from the RF signal level obtained by processing in the reproduction signal processing circuit 11 (S14). Furthermore, the focus is drawn to the second recording layer (the second layer) (S15), the reflective light of irradiated light from the laser diode 2 to the second recording layer (the second layer) under focused state is received by a light-receiving element and the reflectance is calculated from the RF signal level obtained by processing in the reproduction signal processing circuit 11 (S16). These obtained reflectance are once stored in RAM 23, etc.

These steps of S9 to S16 are performed as a function of reflectance calculation unit.

And the type of the optical disc 6 is identified using above threshold value corresponding to the combination of reflectance of each obtained light.

More specifically, when the reflectance of both lights is 15% or more (Y of S17), it is identified as a DVD-ROM (S18).

When the reflectance of DVD light is 15% or more and the reflectance of CD light is 4% or more and less than 15% (N of S17 and Y of S19), it is identified as a DVD+R (S20).

When the reflectance of both lights is 4% or more and less than 15% (N of S17, N of S19 and Y of S21), it is identified as a DVD+RW (S22).

When the reflectance of both lights is less than 4% (N of S21), it is identified as a nonstandard disc (S23).

These steps of S17 to S23 are operated as a function of double-layer disc identification unit.

The identified result of such double-layer disc is supplied to the apparatus setting, etc. for performing recording or reproducing afterward.

When it is identified as a single-layer disc by number of layer identification (N of S8), subsequent identification process may be performed in a conventional way, however, it may be performed using two lights as shown in FIG. 3.

First, a reflective light of irradiated light of the laser beam 3 irradiated to the recording layer under focused state is received by a light-receiving element and the reflectance is calculated from the RF signal level obtained by processing in the reproduction signal processing circuit 11 (S31). Obtained reflectance is once stored in RAM 23, etc.

Continuously, the laser diode 2 for CD of 780 nm wavelength is emitted instead of laser diode 3 (S32), focus is drawn to the recording layer (S33), a reflective light of irradiated light of the laser beam 2 irradiated to the recording layer under focused state is received by a light-receiving element and the reflectance is calculated from the RF signal level obtained by processing in the reproduction signal processing circuit 11 (S34). These obtained reflectance are also stored once in RAM 23, etc.

And the type of the optical disc 6 is identified by using above threshold value corresponding to the combination of reflectance of each obtained light.

More specifically, when the reflectance of both lights is 45% or more (Y of S35), it is identified as a DVD-ROM (S36).

When the reflectance of DVD light is 45% or more and the reflectance of CD light is 5% or more and less than 18% (N of S35 and Y of S37), it is identified as a DVD+R (S38).

When the reflectance of DVD light is 18% or more and 30% or less and the reflectance of CD light is 5% or more and less than 18% (N of S35, N of S37 and Y of S39), it is identified as a DVD+RW (S40).

When the reflectance of both lights is less than 5% (N of S39), it is identified as a nonstandard disc (S41).

Example

Next, result of the identification process based on the Specific Examples of the double-layer disc will be explained.

Specific Example 1

In the case of a DVD+RW (double-layer phase-change sample), a first recording layer formation was produced by forming a first protective layer ($ZnSSiO_2$ of 70 nm thickness), a first information recording layer ($Ag_5In_5Ge_5Sb_{67}Te_{18}$ of 17 nm thickness) and a second protective layer ($ZnSSiO_2$ of 17 nm thickness) in the sequence on a first transparent substrate (polycarbonate) having guiding grooves and a reflective layer (Ag of 120 nm thickness) was disposed on top for easier heat dissipation.

A second recording layer formation was produced by forming a protective layer ($ZnSSiO_2$ of 65 nm thickness), a recording layer ($Ag_5In_5Ge_5Sb_{67}Te_{18}$ of 7 nm thickness), a protective layer ($ZnSSiO_2$ of 18 nm thickness), ZrCO layer (3 nm thickness), a reflective layer (Ag of 10 nm thickness) and a half transparent layer (a mixture of ITO; $In_2O_3$ and SnO of 100 nm thickness) in the sequence on a transparent substrate (polycarbonate) having guiding grooves.

The first recording layer formation and the second recording layer formation were bonded using UV curable resin (SD318) of 55 μm thickness to obtain a double-layer disc.

The track pitch of the substrate of the first recording layer formation was 0.8 μm and the track pitch of the substrate of the second recording layer formation was 0.74 μm.

When a servo control was conducted to above double-layer disc, focus was appropriately drawn to both layers at a DVD wavelength of 660 nm, reflectance of each layer was 7% and 8%, the reflectance of each layer was also detected as 8% and 10% at a CD wavelength of 780 nm, the reflectance of both lights were 4% or more and less than 15% and it was identified as a double-layer DVD+RW by steps S21 and S22 according to the outlined flow chart as shown in FIG. 2.

Specific Example 2

A lacquer was screen-printed (UV cured) on the surface, which is opposite of the surface to which light is irradiated, of the disc produced in Specific Example 1 and it was loaded to the optical disc apparatus 1 with the resin-coated surface facing the surface to which light is irradiated. As a result, the reflectance obtained from RF signal when focused at a DVD wavelength of 660 nm and at a CD wavelength of 780 nm was 1% and it was identified as being none of ROM-type, R-type or RW-type. More specifically, it was identified as a nonstandard disc by step S23 according to the outlined flow chart as shown in FIG. 2.

Specific Example 3

A first pigment layer (cyanine) was formed by spin coating on the first substrate of polycarbonate and a first half transparent layer of IZO (a mixture of $In_2O_3$ and ZnO) was formed by sputtering on the first pigment layer. After a second half transparent layer of IZO was formed by sputtering on a second substrate of polycarbonate, a second pigment layer (cyanine) was formed by spin coating on the second half transparent layer. Next, the first substrate on which the first pigment layer, etc. were formed and the second substrate on which the second pigment layer, etc. were formed were faced so as to have pigment layers inside and bonded with UV curable resin (SD318) to obtain a double-layer disc.

Meanwhile, it was produced by controlling the thickness of each composition layer as follow.
Both substrates: 0.6 mm
First pigment layer: 60 nm
First half transparent layer: 80 nm
Intermediate resin layer: 55 μm
Second pigment layer: 70 nm
Second half transparent layer: 100 nm The track pitch of the first substrate was 0.74 μm and the track pitch of the second substrate was 0.80 μm.

When a servo control was conducted to above double-layer disc, focus was appropriately drawn to both layers at a DVD wavelength of 660 nm, reflectance of each layer was 19% and 18%, the reflectance of each layer was also detected as 5% and 6% at a CD wavelength of 780 nm, the reflectance of DVD light was 15% or more and the reflectance of CD light was 4% or more and less than 15% and it was identified as a double-layer DVD+R by steps S19 and S20 according to the outlined flow chart as shown in FIG. 2.

Specific Example 4

A first inorganic layer of SiN with a thickness of 10 nm was formed on the first substrate of polycarbonate (with pits) by sputtering. A second inorganic layer of $Al_{99}Ti_1$ with a thickness of 100 nm was formed on the second substrate of polycarbonate by sputtering. These substrates were then faced so as to have inorganic layers inside and bonded by UV curable resin (SD318 of 55 μm thickness). The track pitch of the first substrate was 0.74 μm and the track pitch of the second substrate was 0.80 μm.

When a servo control was conducted to above double-layer disc, focus was appropriately drawn to both layers at a DVD wavelength of 660 nm, reflectance of each layer was 25% and 26%, the reflectance of each layer was also detected as 26% and 27% at a CD wavelength of 780 nm, the reflectance of both lights were 15% or more and it was identified as a double-layer DVD-ROM by steps S17 and S18 according to the outlined flow chart as shown in FIG. 2.

By the present inventions 1 and 8, since the type of a double-layer disc is identified by the difference in combination of reflectance when the light of different wavelengths are irradiated, it is possible to easily and correctly identify the type only by reflectance.

By the present inventions 2 and 9, the present inventions 1 and 8 can be easily implemented by using two light sources mounted in the compatible optical disc apparatus for DVD and CD.

By the present inventions 3 and 10, the range of the difference in the combination of reflectance of double-layer disc becomes clear when the present inventions 1, 2, 8 and 9 are implemented.

By the present inventions 4 and 11, it is also possible to properly identify a nonstandard disc.

What is claimed is:

1. A method for identifying a double-layer disc comprising: obtaining a reflectance of each light by irradiating light of different wavelengths under focused state to each layer of a double-layer disc loaded in an optical apparatus, and identifying if the double-layer disc is a recordable double-layer disc, a rewritable double-layer disc or a ROM-type double-layer disc corresponding to the combination of reflectance of each obtained light, wherein when the combination of reflectance of each obtained light is 15% or more for both lights, it is identified as a ROM-type double-layer disc, when the reflectance of one light is 15% or more and the reflectance of the other light is 4% or more and less than 15%, it is identified as a recordable double-layer disc, and when the reflectance of both lights is 4% or more and less than 15%, it is identified as a rewritable double-layer disc.

2. The method for identifying double-layer disc according to claim 1, wherein when the combination of reflectance of each obtained light is less than 4% for both lights, it is identified as a nonstandard disc.

3. The method for identifying double-layer disc according to claim 2, wherein when the reflectance of the light of DVD wavelength is 15% or more and the reflectance of the light of CD wavelength is 4% or more and less than 15%, it is identified as a recordable double-layer disc.

4. An optical disc apparatus comprising: an optical pickup which contains two light sources of different wavelengths and selectively irradiates each light to a loaded disc, a number identification unit for recording layer which identifies if the loaded disc is a double-layer disc in a disc type identification mode, a reflectance calculating unit in which a reflectance of each light is obtained by irradiating light of different wavelengths under focused state to each layer of a double-layer disc using the optical pickup when the loaded disc is a double-layer disc, and a double-layer disc identification unit which identifies if the double-layer disc is a recordable double-layer disc, a rewritable double-layer disc or a ROM-type double-layer disc corresponding to the combination of reflectance of each obtained light.

5. The optical disc apparatus according to claim 4, wherein the wavelength of the light irradiated from one light source is a wavelength for DVD-based disc and the wavelength of the light irradiated from the other light source is a wavelength for CD-based disc.

6. The optical disc apparatus according to claim 4, wherein the double-layer identification unit identifies it as a ROM-type double-layer disc when the combination of reflectance of each obtained light is 15% or more for both lights, as a recordable double-layer disc when the reflectance of one light is 15% or more and the reflectance of the other light is 4% or more and less than 15%, and as a rewritable double-layer disc when the reflectance of both lights is 4% or more and less than 15%.

7. The optical disc apparatus according to claim 6, wherein the double-layer disc identification unit identifies it as a nonstandard disc when the combination of reflectance of each obtained light is less than 4% for both lights.

8. The optical disc apparatus according to claim 5, wherein when the reflectance of the light of DVD wavelength is 15% or more and the reflectance of the light of CD wavelength is 4% or more and less than 15%, it is identified as a recordable double-layer disc.

* * * * *

UNITED STATES PATENT AND TRADEMARK OFFICE
CERTIFICATE OF CORRECTION

PATENT NO. : 7,613,091 B2  Page 1 of 1
APPLICATION NO. : 11/336911
DATED : November 3, 2009
INVENTOR(S) : Shinotsuka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 912 days.

Signed and Sealed this

Fourteenth Day of December, 2010

David J. Kappos
*Director of the United States Patent and Trademark Office*